US008488300B2

(12) United States Patent
Meng et al.

(10) Patent No.: US 8,488,300 B2
(45) Date of Patent: Jul. 16, 2013

(54) CARBON NANOTUBE BASED SUPERCAPACITOR

(75) Inventors: Chui-Zhou Meng, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 269 days.

(21) Appl. No.: 12/939,992

(22) Filed: Nov. 4, 2010

(65) Prior Publication Data

US 2012/0014038 A1    Jan. 19, 2012

(30) Foreign Application Priority Data

Jul. 14, 2010   (CN) .......................... 2010 1 0226801

(51) Int. Cl.
*H01G 9/155*    (2006.01)
*H01G 9/02*    (2006.01)
(52) U.S. Cl.
USPC ........................... 361/502; 361/503; 252/62.2
(58) Field of Classification Search
USPC ................... 361/502, 503; 252/62.2
See application file for complete search history.

(56) References Cited

U.S. PATENT DOCUMENTS

| 6,205,016 | B1 * | 3/2001 | Niu ............................... 361/503 |
| 7,061,749 | B2 * | 6/2006 | Liu et al. ....................... 361/502 |
| 2003/0054232 | A1 * | 3/2003 | Zucker ......................... 429/144 |
| 2007/0134555 | A1 * | 6/2007 | Ren et al. ..................... 429/245 |
| 2009/0046412 | A1 * | 2/2009 | Kubota ......................... 361/503 |
| 2009/0116170 | A1 * | 5/2009 | Liu et al. ....................... 361/503 |
| 2011/0170236 | A1 * | 7/2011 | Young ........................... 361/502 |

OTHER PUBLICATIONS

Lewandowski et al., Chemical capacitor based on activated carbon powder and poly(vinyl alcohol)-H2SO4 proton conducting polymer electrolyte, 2001, Polish Journal oc Chemistry, 75(12), 1913-1920.*
Wada et al., Electrochemical characteristics of new electric double layer capacitor with acidic polymer hydrogel electrolyte, 2006, Journal of Power Sources, 159(2), 1464-1467.*

* cited by examiner

*Primary Examiner* — Eric Thomas
(74) *Attorney, Agent, or Firm* — Altis Law Group, Inc.

(57) ABSTRACT

A supercapacitor includes a first electrode, a second electrode, and a solid-state polymer electrolyte. The first electrode and the second electrode are spaced from each other and immersed in the solid-state polymer electrolyte. The first and second electrode includes a carbon nanotube structure and an electrically conductive polymer layer. The carbon nanotube structure includes a number of carbon nanotubes and a number of micropores defined between adjacent two carbon nanotubes. The electrically conductive polymer layer coats surfaces of the number of carbon nanotubes.

15 Claims, 9 Drawing Sheets

US 8,488,300 B2

CARBON NANOTUBE BASED SUPERCAPACITOR

RELATED APPLICATIONS

This application claims all benefits accruing under 35 U.S.C. §119 from China Patent Application No. 201010226801.1, filed on Jul. 14, 2010, in the China Intellectual Property Office, the contents of which are hereby incorporated by reference.

BACKGROUND

1. Technical Field

The present disclosure relates to energy storage devices and, in particular, relates to capacitors and, more particularly, to a supercapacitor.

2. Description of Related Art

Nowadays, portable electronic devices (such as mobile phones, notebook computers and digital cameras) are becoming more multi-functional and becoming smaller, thinner, lighter, flexible, and even rolls up, to meet the rapid growth for modern market demands. However, the energy management development (such as batteries and supercapacitors) is still inferior. Therefore, fabricating superior lightweight power sources and greater flexibility remains a challenging task.

Recently carbon nanotubes (CNT) or graphene nanosheets have been used as electrodes for supercapacitors and batteries. However, most work is done in the conventional energy-storage device configuration (a separator sandwiched between two electrodes sealed in liquid electrolyte), which suffers two major drawbacks for practical applications. First, liquid electrolyte requires high-standard safety encapsulation materials and technology. Electrolyte leakage will result in harm to the environment. Second, the component parts are not integrated with each other and tend to move relative to each other under strong flexing which decreases the electrochemical performance and cycle life of the device. Currently, there are only two configurations that are manageable (button and spiral wound cylinder) for current energy-storage devices. However, their clumsy bulky shapes have limited their applications in the future advancements of thin and wearable electronic devices.

What is needed, therefore, is to provide a supercapacitor with an outstanding supercapacitor performance under highly flexible (twisting) conditions.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
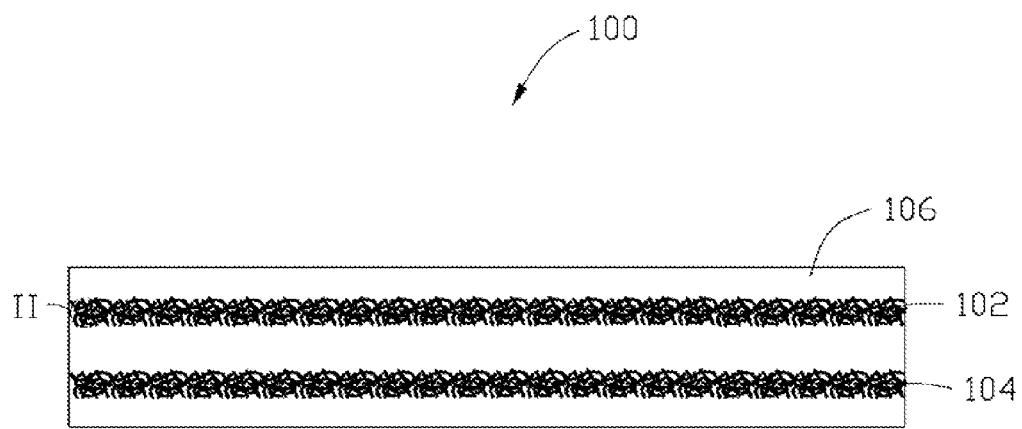
FIG. 1 shows a cross-sectional view of an embodiment of a CNT based supercapacitor.

Referring to FIG. 1, one embodiment of a CNT based supercapacitor 100 with a planar structure, includes a first electrode 102, a second electrode 104, and a solid-state polymer electrolyte 106. The first electrode 102 and the second electrode 104 are spaced from each other and dispersed in the solid-state polymer electrolyte 106. The first electrode 102 is substantially parallel to the second electrode 104 and arranged along a lengthwise direction of the supercapacitor 100. The first electrode 102, the second electrode 104, and the solid-state polymer electrolyte 106 combine with each other to form a single structure with good flexibility. The first electrode 102 can be a CNT composite film with a planar structure, and the second electrode 104 can be the same.

Figure 2:
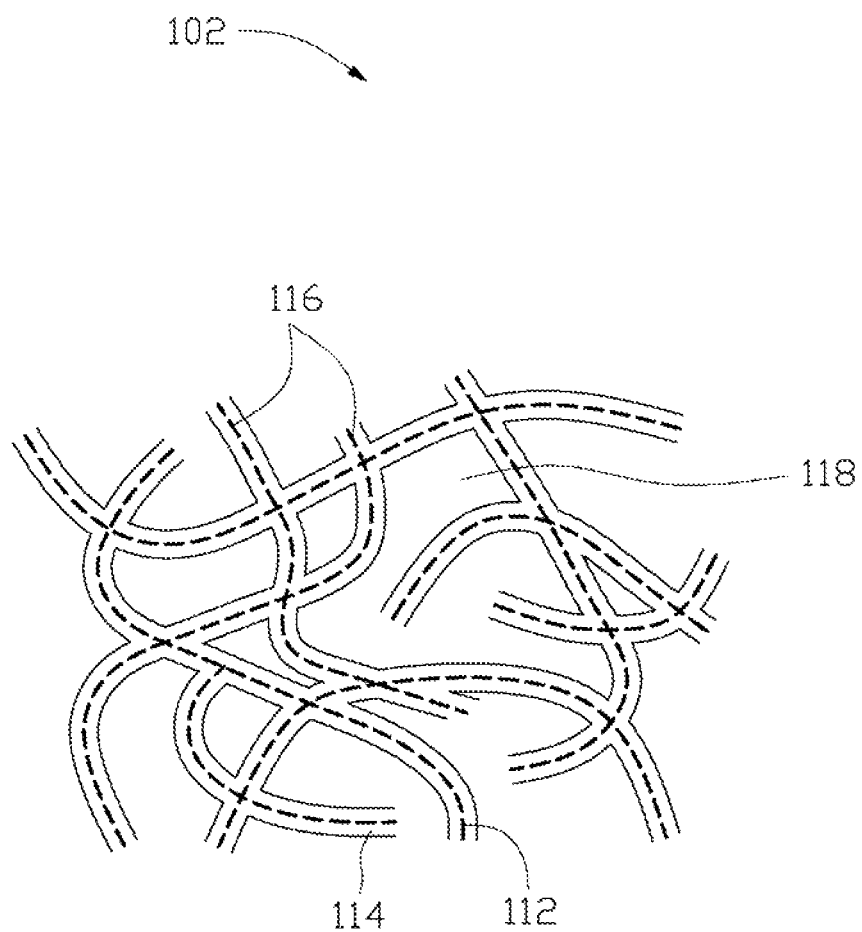
FIG. 2 shows a schematic view of a first electrode of the CNT based supercapacitor in FIG. 1.

Referring to FIG. 2, the first electrode 102 can be a porous CNT composite film made of CNTs and electrically conductive polymer. The first electrode 102 includes a CNT structure 116 and an electrically conductive polymer layer 114. The CNT structure 116 is a porous structure and works as a framework to support the electrically conductive polymer layer 114. The first electrode 102 has a thickness in a range from about 1 micrometer to about 100 micrometers.

The CNT structure 116 includes a plurality of CNTs 112 combined by van der Waals attractive force therebetween. The CNTs 112 form a film shaped CNT network. The term "free-standing" includes, but is not limited to, a structure that does not have to be supported by a substrate and can sustain its own weight when it is hoisted by a portion of the structure without any significant damage to its structural integrity. The free-standing property is achieved only due to the van der Waals attractive force between adjacent CNTs 112 in the free-standing CNT structure 116. The free-standing CNT structure 116 includes a plurality of micropores 118 defined by adjacent CNTs 112 in the CNT structure 116. The size of the plurality of micropores 118 can be less than 1 micron. The size of the plurality of micropores 118 represents the maximum distance between two micropores 118. The CNT structure 116 has a large specific surface area (e.g., above 30 m$^2$/g). In one embodiment, the size of the micropores 118 is in a range from about 50 nanometers to about 500 nanometers.

For the electrode materials, individual CNT 112 and their bundles first randomly intertwine together to form a free-standing CNT network (the CNT structure 116), with an electrical conductivity that can be as high as 15000 S/m. The volume density of the CNTs 112 in the CNT structure 116 can be less than about 30%, leaving about 70% or more of the total networks in the form of a porous structure, making it an ideal template with high specific surface area for an electrically conductive polymer layer 114 coating.

The electrically conductive polymer layer 114 is coated on the surface of the CNT structure 116. The electrically conductive polymer layer 114 wraps around the plurality of CNTs 112 to form a tubular coating layer structure. The individual CNT 112 and the CNT structure 116 serve as the core and the template to support the electrically conductive polymer layer 114. In one embodiment, the electrically conductive polymer layer 114 is coated on the whole surface of the CNT structure 116, such that the surface of each CNT 112 is coated by the electrically conductive polymer layer 114.

Further, the CNTs 112 in the CNT structure 116 can be orderly or disorderly arranged. The term 'disordered CNT structure' includes, but is not limited to, a structure in which the CNTs are arranged along many different directions so that the number of CNTs arranged along each different direction can be almost the same (e.g. uniformly disordered) and/or entangled with each other. 'Ordered CNT structure' includes, but is not limited to, a structure in which the CNTs are arranged in a consistently systematic manner, e.g., the CNTs are arranged approximately along a same direction and or have two or more sections within each of which the CNTs are arranged approximately along a same direction (different sections can have different directions). In one embodiment, the CNT structure 116 includes a plurality of CNTs 112 disorderly arranged.

The CNTs 112 in the CNT structure 116 can be single-walled, double-walled, and/or multi-walled CNTs. The CNT structure 116 may include many layers of ordered and/or disordered CNT films. Each layer of the ordered and/or disordered CNT films is coated with one electrically conductive polymer layer 114.

Figure 3:
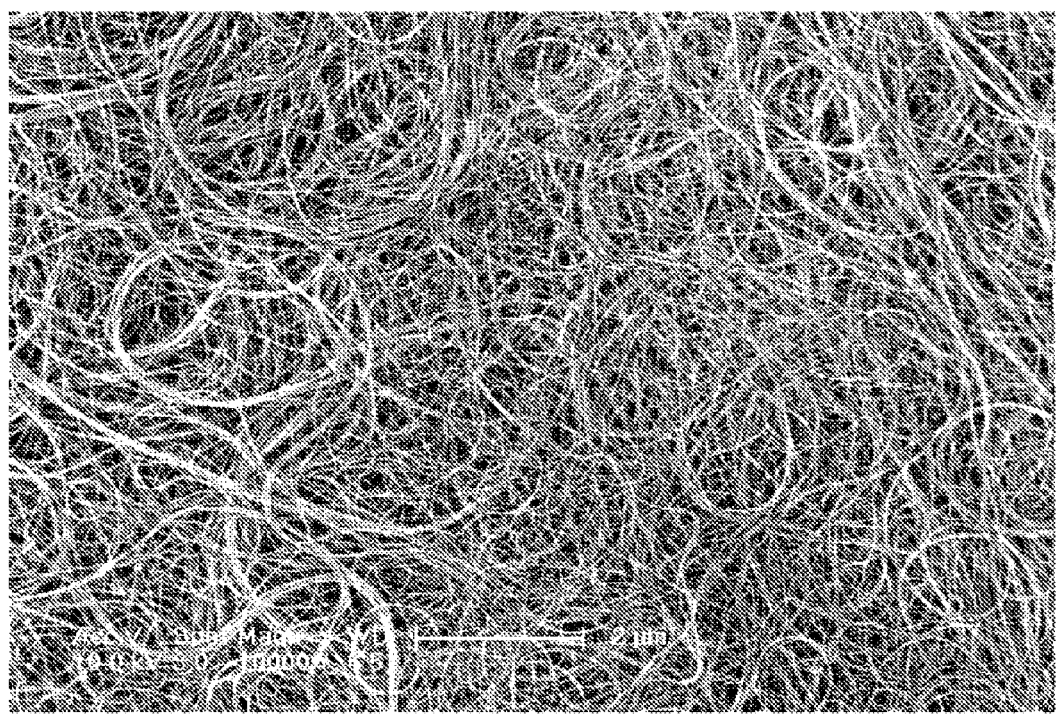
FIG. 3 shows a scanning electron microscope (SEM) image of a flocculated CNT film with CNTs entangled with each other.

In one embodiment, the CNT structure 116 is a disordered CNT structure including a flocculated CNT film. Referring to FIG. 3, the flocculated CNT film can include a plurality of long, curved, disordered CNTs entangled with each other. The length of the CNTs in the film can be greater than 10 centimeters. Furthermore, the flocculated CNT film can be isotropic. The CNTs can be substantially uniformly dispersed in the flocculated CNT film. The van der Waals attractive force therebetween, forms an entangled structure with a plurality of micropores defined in the flocculated CNT film acting upon the adjacent CNTs. If there is more than one flocculated CNT film, the electrically conductive polymer layer 114 is coated on each one of the flocculated CNT film.

The flocculated CNT film is very porous. The size of the micropores can be less than 10 micrometers. The microporous nature of the flocculated CNT film will increase the specific surface area of the CNT structure. Further, because the CNTs in the CNT structure 116 are entangled with each other, the CNT structure 116 employing the flocculated CNT film has excellent durability and flexibility, and can be fashioned into many desired shapes with a low risk to the integrity of the CNT structure 116. Thus, the CNT structure 116 may be formed into many shapes with good flexibility. The flocculated CNT film, in some embodiments, will not require the use of structural support due to the CNTs being entangled and adhered together by van der Waals attractive force therebetween. The thickness of the flocculated CNT film can range from about 0.5 nanometers to about 500 micrometers. It is also understood that many of the embodiments of the CNT structure 116 are flexible and/or do not require the use of structural support to maintain their structural integrity.

A material of the electrically conductive polymer layer 114 can be polyaniline, polypyrrole, polythiophene, polyacetylene, polyparaphenylene, poly phenylene vinylene, or any combination of them. A thickness of the electrically conductive polymer layer 114 is in a range from about 30 nanometers to about 90 nanometers. A weight percentage of the electrically conductive polymer layer 14 in the first electrode 102 is in a range from about 5% to about 80%.

In one embodiment, the material of the electrically conductive polymer layer 114 is polyaniline, and the weight percentage of the electrically conductive polymer layer 114 in the first electrode 102 is in a range from about 5% to about 20%. After an in situ chemical polymerization of aniline monomer, polyaniline forms a uniform coating layer (thickness in a range form about 50 nm to about 90 nm) around the surface of the CNTs 112 and their bundles of the CNT structure 116. Macroscopically, the typical thickness of the CNT structure 116 before and after the polyaniline coating can be about 20 micrometers and 30 micrometers. In one embodiment, the content of the polyaniline (about 65.1 wt %) is well controlled to not destroy the porous structure of the CNT structure 116.

It can be understood that the framework of the CNT structure 116 of the first electrode 102 is well retained after the electrically conductive polymer layer 114 coating process in a liquid phase. This would lead to two advantages for the first electrode 102. First, a good porous structure provides an extremely large specific surface area of electrode/electrolyte interface, facilitating full use of the large pseudocapacitance of the electrically conductive polymer layer 114. Second, to assure flexibility for the first electrode 102, inter-connections of the plurality of CNTs 112 and their bundles provide fast electron transport path within the thin film first electrode 102, which leads to low internal resistance. This is especially important in the lengthwise direction when the geometry area of the electrode is large. In addition, because the electrically conductive polymer layer 114 is nano-sized, electrons would pass across a shorter distance from the electrically conductive polymer layer 114 to the highly conducting CNT structure 116.

Figure 4:
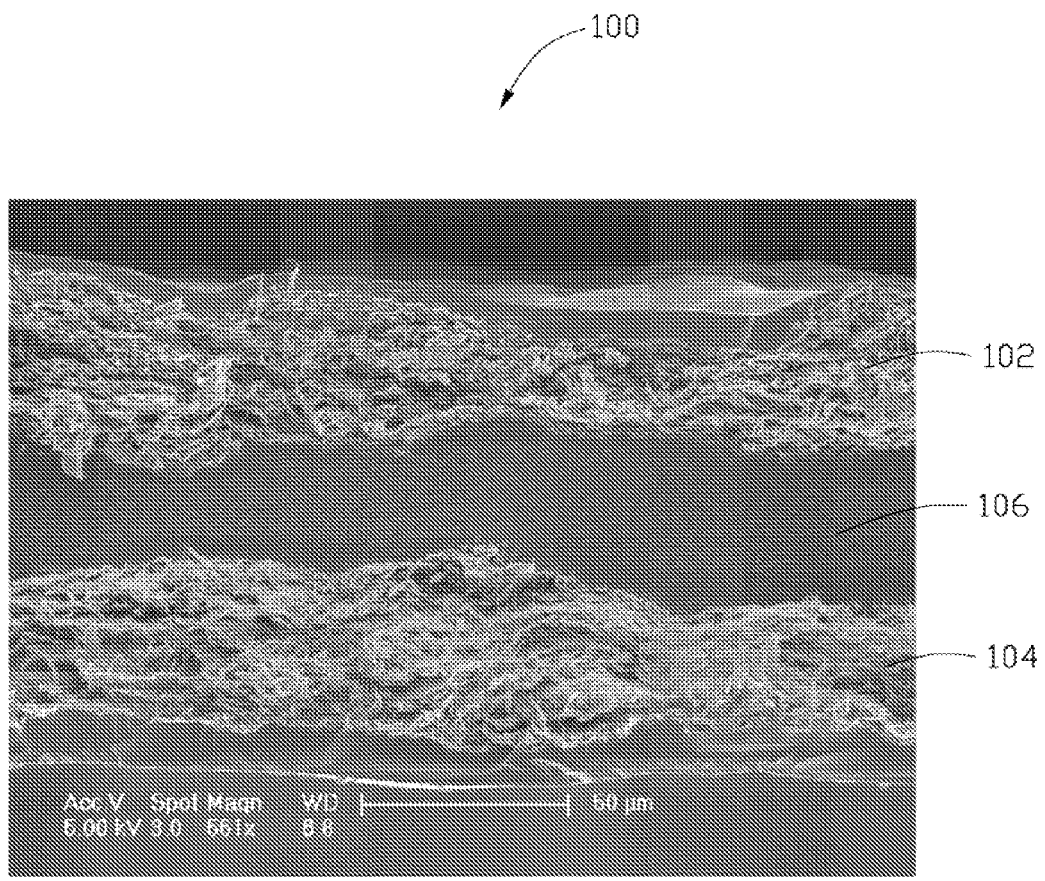
FIG. 4 shows an SEM image of an embodiment of a CNT based supercapacitor of FIG. 1.

The solid-state polymer electrolyte 106 can be a polymer electrolyte membrane made of a polymer gel electrolyte. The solid-state polymer electrolyte 106 has a thickness in a range from about 100 micrometers to about 1 millimeter. Referring to FIG. 1, FIG. 2 and FIG. 4, the first electrode 102 and the second electrode 104 are dispersed in the solid-state polymer electrolyte 106 and are spaced from each other. The first electrode 102 and the second electrode 104 are porous structures with a plurality of micropores 118. The polymer gel electrolyte of the solid-state polymer electrolyte 106 is immersed into the micropores 118 of the first electrode 102 and the second electrode 104 across the thickness. It is found that no cracking appear during the intense sample preparation condition (cracked in liquid $N_2$), demonstrating the CNT based supercapacitor 100 is a single structure with good flexibility.

The solid-state polymer electrolyte 106 can be obtained by dissolving the electrolyte in a gel. The electrolyte can be sulfuric acid ($H_2SO_4$), hydrochloric acid, sodium hydroxide, potassium hydroxide or sodium sulfate. The gel is formed by dissolving a polymer in water. The polymer can be polyvinyl alcohol, polyethylene glycol, polyvinylidene fluoride, polyacrylonitrile, polyacrylamide, polycarbonate, poly vinyl chloride, polyethylene, polypropylene, polystyrene or polycarbonate. In one embodiment, the solid-state polymer gel electrolyte 106 is $H_2SO_4$-polyvinyl alcohol ($H_2SO_4$-PVA) gel electrolyte. The $H_2SO_4$-PVA gel electrolyte includes about 44.9 wt % sulfuric acid, about 45.8 wt % poly vinyl alcohol, and about 9.3 wt % water.

The $H_2SO_4$-PVA gel electrolyte can be made by mixing about 6 g $H_2SO_4$ with about 60 ml deionized water, and then adding about 6 g PVA powder. The whole mixture is heated up steadily to about 85° C. under vigorous stirring until the solution becomes clear. The solution is then maintained at about 85° C. without stirring.

Figure 5:
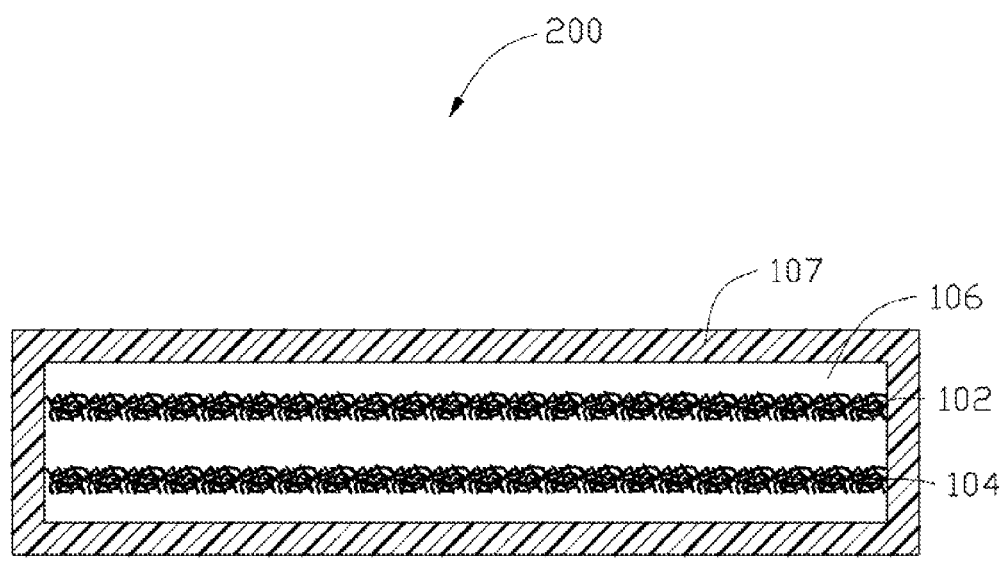
FIG. 5 shows a cross-sectional view of an embodiment of a CNT based supercapacitor with a container.

Referring to FIG. 5, one embodiment of a CNT based supercapacitor 200 can include a first electrode 102, a second electrode 104, a solid-state polymer electrolyte 106, and a container 107. The first electrode 102 and the second electrode 104 are spaced from each other and dispersed in the solid-state polymer electrolyte 106 to form a whole structure. The first electrode 102, the second electrode 104 and the solid-state polymer electrolyte 106 are filled in the container 107.

The material of the container 107 can be an insulating flexible material, such as an insulating polymer. In one embodiment, the container 107 is made of a polyethylene terephthalate (PET) transparent film.

Figure 6:
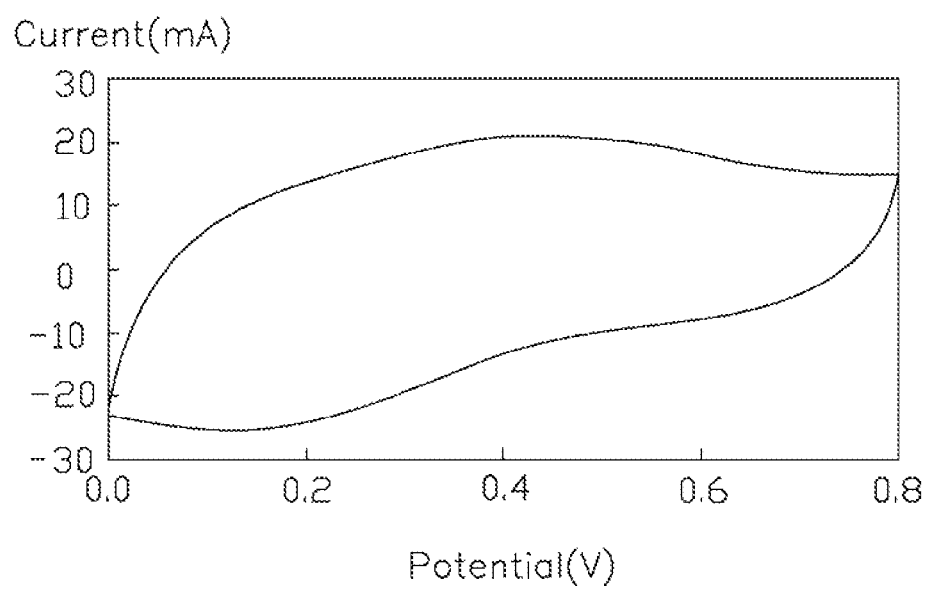
FIG. 6 shows the cyclic voltammetry (CV) curves of the CNT based supercapacitor of one embodiment of FIG. 5.
Figure 7:
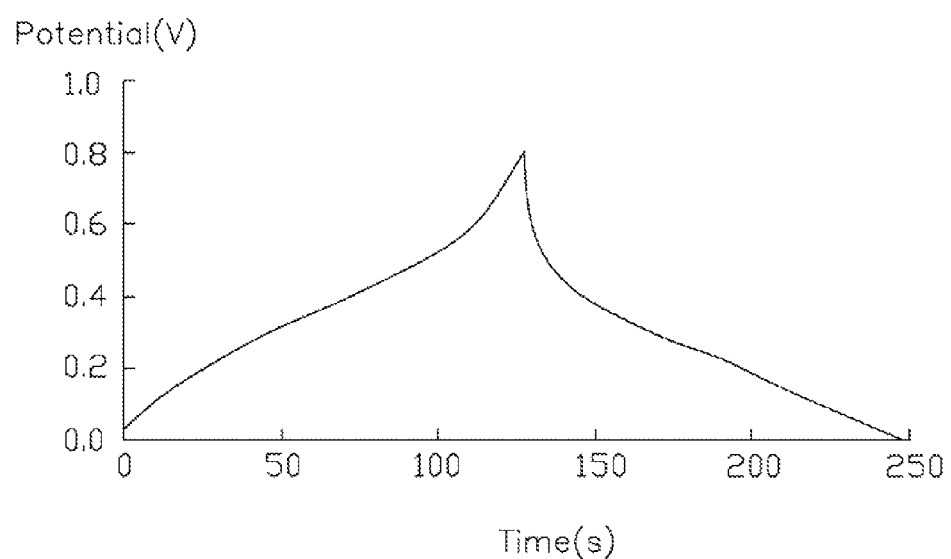
FIG. 7 shows one cycle of the galvanostatic charge-discharge curves of the supercapacitor of one embodiment of FIG. 5.

FIG. 6 is a cyclic voltammetry (CV) curve of the supercapacitor of one embodiment. FIG. 7 shows one cycle of galvanostatic charge-discharge curve of the supercapacitor of one embodiment. The instant specific capacity of the CNT based supercapacitor is about 500 F/g in FIG. 7.

Figure 8:
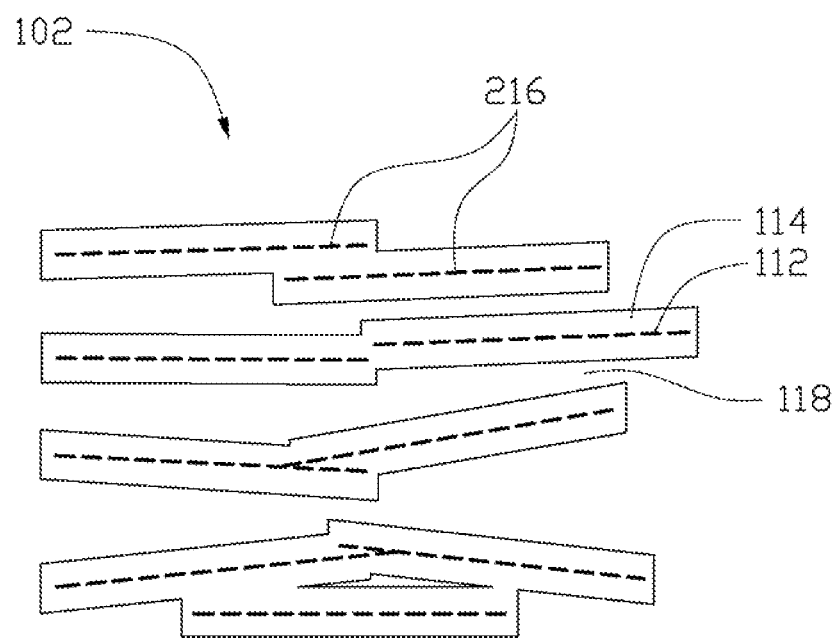
FIG. 8 shows a cross-sectional view of a first electrode of an embodiment of a CNT based supercapacitor.

Referring to FIG. 8, in one embodiment, the first electrode 102 includes a CNT structure 216 and an electrically conductive polymer layer 114. The CNT structure 216 is an ordered CNT structure and includes a plurality of micropores 118 and CNTs 112.

The CNTs 112 are orderly arranged in the CNT structure 216. The micropores 118 are formed between the adjacent CNTs 112 in the CNT structure 216. Sizes of the micropores 118 are in a range from about 50 nanometers to about 500 nanometers. The electrically conductive polymer layer 114 is coated on the entire surface of the CNT structure 216, such that the surface of each CNT 112 is coated by the electrically conductive polymer layer 114. The CNT structure 216 can include at least one drawn CNT film.

Figure 9:
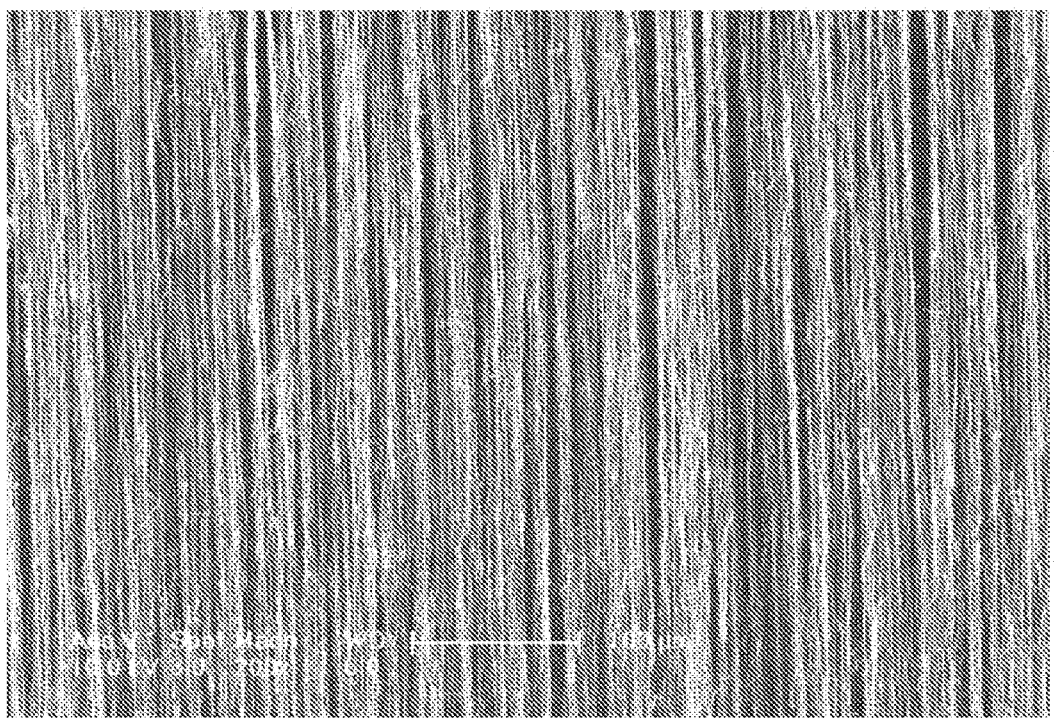
FIG. 9 shows an SEM image of a drawn CNT film of the CNT structure of the first electrode of the CNT based supercapacitor of one embodiment of FIG. 1.

Referring to FIG. 9, the drawn CNT film includes a plurality of successive and oriented CNTs joined end-to-end by van der Waals attractive force therebetween. The drawn CNT film can be formed by drawing a film from a CNT array that is capable of having a film drawn therefrom. The drawn CNT film includes a plurality of spaces/micropores formed between the adjacent CNTs in the drawn CNT film. The CNT structure 216 can also include at least two stacked drawn CNT films. An angle α between the preferred orientations of the CNTs in the two adjacent CNT films is in a range from about 0 degrees to about 90 degrees.

It is to be understood that the above-described embodiments are intended to illustrate rather than limit the present disclosure. Variations may be made to the embodiments without departing from the spirit of the disclosure as claimed. Any elements discussed with any embodiment are envisioned to be able to be used with the other embodiments. The above-described embodiments illustrate the scope of the disclosure but do not restrict the scope of the disclosure.

What is claimed is:

1. A supercapacitor comprising:
a first electrode and a second electrode spaced from the first electrode, each of the first and the second electrodes comprising a carbon nanotube structure and an electrically conductive polymer layer, the carbon nanotube structure comprising a plurality of carbon nanotubes disorderly oriented, and a plurality of micropores defined between adjacent two of the carbon nanotubes, wherein the electrically conductive polymer layer coats surfaces of the plurality of carbon nanotubes; and
a solid-state polymer electrolyte, wherein the first electrode and the second electrode are immersed in the solid-state polymer electrolyte, and the solid-state polymer electrolyte is a sulfuric acid polyvinyl alcohol gel electrolyte consisting of 44.9 wt % sulfuric acid, 45.8 wt % poly vinyl alcohol, and 9.3 wt % water.

2. The supercapacitor of claim 1, wherein the carbon nanotube structure is a film shaped free-standing structure, and the plurality of carbon nanotubes in the carbon nanotube structure are combined by van der Waals attractive force between them.

3. The supercapacitor of claim 2, wherein the carbon nanotube structure supports the electrically conductive polymer layer.

4. The supercapacitor of claim 1, wherein the carbon nanotube structure has a thickness in a range from about 1 micrometer to about 100 micrometers.

5. The supercapacitor of claim 1, wherein the electrically conductive polymer layer is polyaniline.

6. The supercapacitor of claim 5, wherein the electrically conductive polymer layer has a thickness in a range from about 50 nanometers to about 90 nanometers.

7. The supercapacitor of claim 1, wherein the solid-state polymer electrolyte is a polymer electrolyte membrane having a thickness in a range from about 100 micrometers to about 1 millimeter.

8. A supercapacitor comprising:
two carbon nanotube composite films spaced from each other, wherein each of the two carbon nanotube composite films is a porous structure comprising a carbon nanotube structure and an electrically conductive polymer, the carbon nanotube structure comprising a plurality of carbon nanotubes disorderly oriented, and a plurality of micropores defined between adjacent two of the carbon nanotubes, the electrically conductive polymer coating surfaces of the plurality of carbon nanotubes to form an electrically conductive polymer layer;
a solid-state polymer electrolyte, wherein the two carbon nanotube composite films are immersed in the solid-state polymer electrolyte, and the solid-state polymer electrolyte is a sulfuric acid polyvinyl alcohol gel electrolyte consisting of 44.9 wt % sulfuric acid, 45.8 wt % poly vinyl alcohol, and 9.3 wt % water; and
a container, wherein the solid-state polymer electrolyte and the two carbon nanotube films are filled in the container.

9. The supercapacitor of claim 8, wherein the plurality of carbon nanotubes are combined by van der Waals attractive force between them.

10. The supercapacitor of claim 9, wherein a thickness of the carbon nanotube structure is in a range from about 20 micrometers to about 30 micrometers.

11. The supercapacitor of claim 8, wherein a weight percentage of the electrically conductive polymer in each one of the two carbon nanotube composite films is in a range from about 5% to about 80%.

12. The supercapacitor of claim 8, wherein a material of the electrically conductive polymer is polyaniline.

13. The supercapacitor of claim 8, wherein the container is made of a flexible insulating polymer.

14. The supercapacitor of claim 8, wherein the container is made of polyethylene terephthalate.

15. A supercapacitor comprising:
a first electrode and a second electrode spaced from the first electrode, each of the first and the second electrodes comprising a plurality of carbon nanotubes disorderly oriented, a plurality of micropores defined between adjacent two of the carbon nanotubes, and an electrically conductive polymer layer, wherein the electrically conductive polymer layer wraps surfaces of each of the plurality of carbon nanotubes; and a solid-state polymer electrolyte immersed in the plurality of micropores of the first electrode and the second electrode, wherein the solid-state polymer electrolyte is sulfuric acid polyvinyl alcohol gel electrolyte, the sulfuric acid polyvinyl alcohol gel electrolyte consists of about 44.9 wt % sulfuric acid, about 45.8 wt % poly vinyl alcohol, and about 9.3 wt % water.

* * * * *